(12) United States Patent
Mori et al.

(10) Patent No.: US 6,646,536 B2
(45) Date of Patent: Nov. 11, 2003

(54) SINGLE COIL OF COIL UNIT FOR LINEAR MOTOR AND WINDING FORMER THEREOF

(75) Inventors: Hidehiko Mori, Hachiouji (JP); Yasushi Koyanagawa, Isehara (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 8 days.

(21) Appl. No.: 10/105,951

(22) Filed: Mar. 26, 2002

(65) Prior Publication Data

US 2003/0184425 A1 Oct. 2, 2003

(51) Int. Cl.⁷ ............................................... H01F 27/28
(52) U.S. Cl. ..................... 336/222; 336/224; 336/223
(58) Field of Search ................................ 336/198, 208, 336/192, 222, 225, 223

(56) References Cited

U.S. PATENT DOCUMENTS

| | | | | |
|---|---|---|---|---|
| 1,167,722 A | * | 1/1916 | Scott | 336/224 |
| 2,765,448 A | * | 10/1956 | Duffing | 336/224 |
| 2,930,014 A | * | 3/1960 | Van Der Hook et al. | 336/222 |
| 3,815,068 A | * | 6/1974 | Hori et al. | 336/224 |
| 4,449,685 A | * | 5/1984 | Salmon et al. | 246/8 |

FOREIGN PATENT DOCUMENTS

JP   2001-067955   3/2001

OTHER PUBLICATIONS

Specification forming part of Letters Patent No. 34,674 dated Mar. 18, 1862. Improvement in Boxes for Car–Axles, William Ebbitt, of New York, N. Y.

* cited by examiner

Primary Examiner—Anh Mai
(74) Attorney, Agent, or Firm—Arent Fox Kintner Plotkin & Kahn

(57) ABSTRACT

A single coil for constituting a compact coil unit for a linear motor is provided. A single coil of a coil unit for a linear motor includes a pair of effective conductors for contributing to generating a thrust force for a moving body of a linear motor, and connecting conductors for connecting between the effective conductors. The connecting conductors are offset from a coil plane which includes the pair of effective conductors, and extend in parallel with the coil plane, and simultaneously a transverse section of the connecting conductors has an approximately trapezoidal shape including parallel sides which are approximately perpendicular to the coil plane, and a tilted side which is opposed to the coil plane, and is tilted toward a direction opposite to the direction of the offset in the extending state.

5 Claims, 8 Drawing Sheets

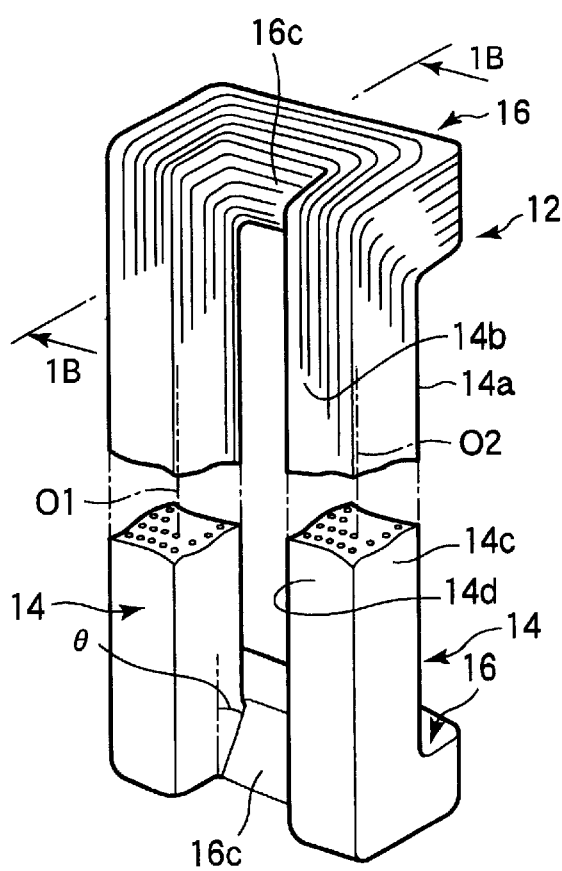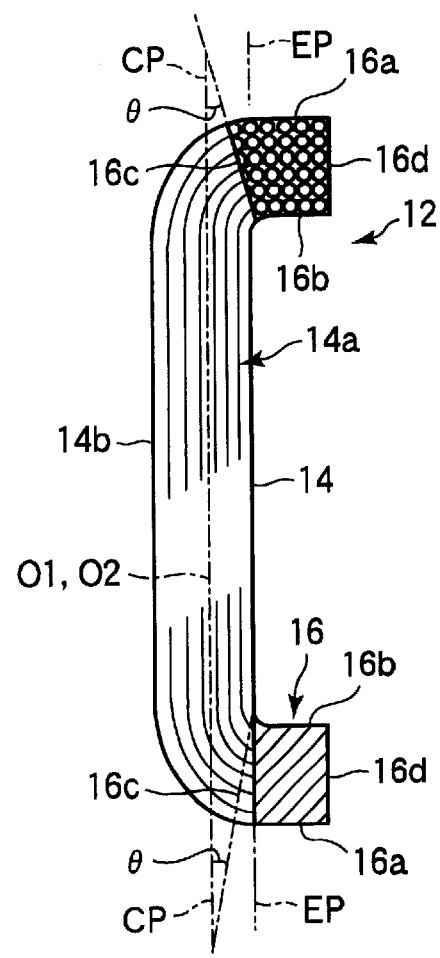

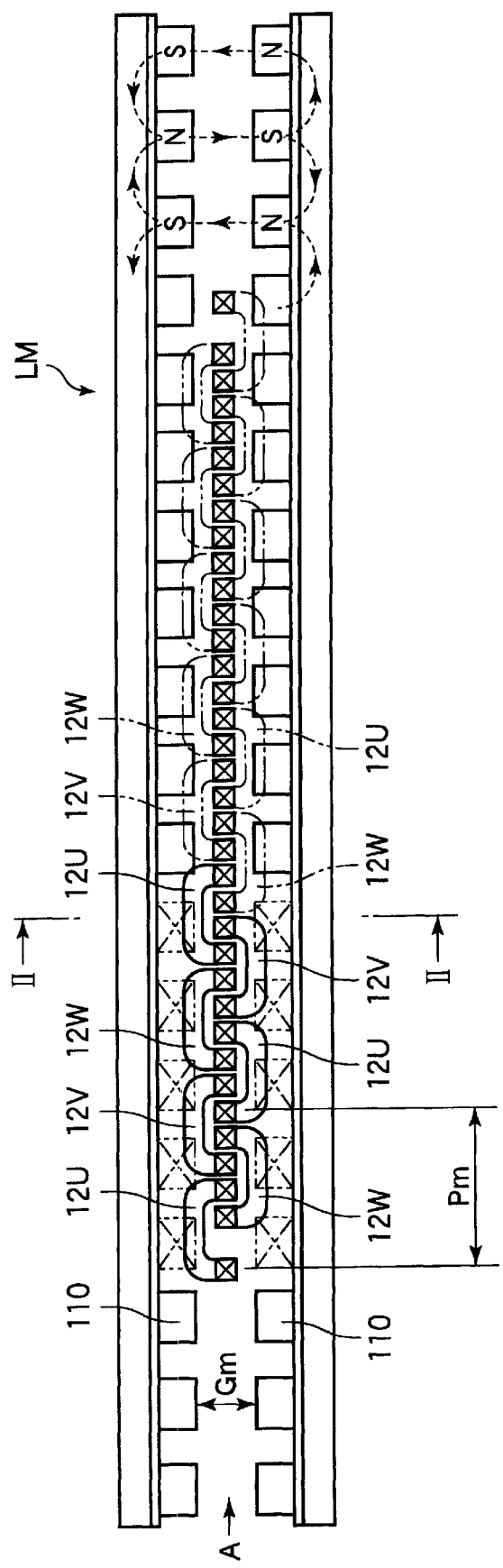

SINGLE COIL OF COIL UNIT FOR LINEAR MOTOR AND WINDING FORMER THEREOF

BACKGROUND OF THE INVENTION

1. Field of the Invention

The present invention relates to a single coil and its winding former of a coil unit for a linear motor.

2. Description of the Related Art

A linear motor has a simple structure, comprises a small number of parts, and drives a moving body linearly, and its drive is precise and quick. It is widely applied to linear driving devices and positioning devices in all fields such as exposing devices for manufacturing semiconductors, and highly precise machine tools.

The linear motor generally comprises a magnetic pole unit including magnets, and a coil unit including coils, one of them is fixed to a base as a fixed body, and the other of them is connected to a moving table or the like as a moving body. The magnetic pole unit and the coil unit are placed opposing to each other at a certain gap. When a magnetic force is generated between them, the magnetic force as a thrust force drives the moving body without contact while the gap is being maintained.

A multi-pole/multi-phase DC linear motor is disclosed as one form of the linear motor. A magnetic pole unit is formed such that multiple N/S poles are placed such that neighboring poles have different polarities in this linear motor. One coil unit is formed such that multiple single coils are wired with one another as a whole.

The individual single coils constituting the coil unit have an approximately rectangular ring-like shape altogether. Two sides of the four sides of this rectangle, which oppose to each other, and are orthogonal to a moving direction, function as a pair of effective conductors contributing to generating a thrust force for a moving body of a linear motor. The other two sides opposing to each other form a pair of connecting conductors for connecting between the effective conductors, and do not contribute to generating the thrust force of the linear motor.

The thrust force F (N) of the linear motor is represented as: F=BIL where B (T) is a magnetic flux density acting on the effective conductors, I (A) is an electric current flowing thorough the effective conductors, and L (m) is the length of the effective conductors. When the number of turns of the single coil is n, F is represented as: F=BniL where i is a current per conductive wire.

Thus, it is necessary to increase the number of the turns n of the single coil for securing as large the thrust force F as possible with predetermined dimensions, or with predetermined various types of specifications of constituting members.

Because not only the area of the transverse section of the effective conductors, but also that of the connecting conductors increases as the number of turns n increases, a storage of the individual single coils becomes a problem when the multiple single coils are connected to form a coil unit.

Because the effective conductors of the individual single coils of the coil unit used for the linear motor are arranged closely to one another in a traveling direction, and the connecting conductors of the individual single coils take up spaces, it is important how to treat the connecting conductors, and then how to arrange multiple singe coils consecutively.

For example, parts close to the ends of effective conductors are bent from a coil plane (a plane including axial centers of the effective conductors) on a single coil, and three types of the single coils different in the degree of the bend are provided in the U.S. Pat. No. Re 34,674. Namely, three types of the single coils which are different in an offset of the connecting conductors from the coil plane are provided, and are sequentially arranged in a traveling direction for providing a constitution for closely arranging the effective conductors of the individual single coils while preventing interference between the connecting conductors.

However, because this constitution requires three types of single coils in consequence, the constitution has problems that the manufacturing cost increases, and the three types of connecting conductors occupy unique traveling spaces (projected areas on a section transverse to the traveling direction) respectively, thereby extremely increasing spaces around the connecting conductors as a whole.

Especially, when the number of turns of the coil n increases for increasing the transverse section of the effective conductors, thereby increasing a thrust force (a drive capability) of the motor, the transverse section of the connecting conductors increases accordingly, the space occupied by the connecting conductors becomes extremely large, and it is impossible to design a motor for increasing its space efficiency.

Also, when the entire coil unit is stored in a sealed container for cooling to avoid an effect of generated heat from the coil unit, for example, if the space occupied by the connecting conductors increases, a design for placing the magnet unit with maintaining a proper gap to the effective conductors becomes difficult while the coil unit is being stored in the sealed container.

In view of the foregoing, the inventors have proposed a single coil for a linear motor which improves these defects, and a coil unit using the same single coils in Japanese Patent Laid Open No. 2001-67955. The following section briefly describes the art because it helps understanding the problems to be solved by the present invention, and the validity of the present invention properly.

Multiple coil seats 3 shown in (a) of FIG. 8 are piled while the size is being changed gradually, a single coil 2 is formed such that ends of effective conductors 4 together with connecting conductors 6 are bent largely at an approximately right angle with respect to a coil plane CP, and the resultant single coil 2 in a saddle-like shape is used in this art as shown in (b). Single coils 2a whose connecting conductors 6 are bent toward right, and single coils 2b whose connecting conductors 6 are bent toward left with respect to a traveling direction A are alternately inserted into companion effective conductors 4a and 4b, and they are arranged closely and orderly with almost no gaps as shown in (c) of the FIG. 8. The individual single coils 2 are wired with one another according to specifications of a coil unit 10 to form the single coil unit for one linear motor.

When the single coils 2 are driven with a three-phase current, the phases of the current for the neighboring single coils 2 are shifted to one another by 120 degrees, and a three-phase coil unit with U, V, and W phases is formed. One pole, which is a constituting unit of a linear motor is defined as a part from one N/S pole to a next N/S pole in a magnet arrangement. The number of the corresponding single coils 2 (per pole) is three, and they consist of the single coils 2 for the U, V, and W phases.

Commercially available conventional coil units for linear motors including one according to the U.S. Pat. No. Re 34, 674 are formed by combining three types of single coils different in a form of connecting conductors bent toward left or right with respect to a traveling direction as a base, and has a characteristic that coil sections corresponding to three phases appear in a section perpendicular to the traveling direction (coinciding with a direction A). This means that the projected area in the transverse section in the traveling direction has an area corresponding at least three of the transverse sections of the connecting conductors.

On the other hand, the coil unit 10 relating to Japanese Patent Laid Open No. 2001-67955 includes only one type of the single coils 2, and they are simply oriented toward left or right, and combined with one another to form the coil unit 10. Thus, the coil unit 10 has a remarkable feature that the coil sections corresponding to only two phases appear in a section view of the coil unit 10. This means that projected area in the transverse section in the traveling direction basically has an area corresponding to only the two transverse sections of the connecting conductors.

In addition, the single coil 2 and the coil unit 10 according to Japanese Patent Laid Open No. 2001-67955 successfully include many strong advantages because a) only one type of single coils 2 form the coil unit 10, b) the length Wo of the connecting conductor 6 is formed as short as possible with respect to the length Lo of the effective conductor 4, and the effective conductors 4 are arranged without a gap, and c) the single coil 2 has a shape where a pair of connecting conductors 6 are bent at an approximately right angle with respect to the effective conductors 4, and the connecting conductor 6 has the shortest length, or occupies the minimum space while connecting the individual effective conductors 4.

SUMMARY OF THE INVENTION

An object of the present invention is to increase the space efficiency of the single coil including the Japanese Patent Laid Open No. 2001-67955, and is more specifically to further decrease the width of the connecting conductors protruding from the effective conductors toward left and right with respect to the traveling direction, thereby enabling a more compact structure, and simultaneously simplifying a comprehensive design including an arrangement of the magnet units.

A single coil according to a first aspect of the present invention is a single coil of a coil unit for a linear motor wherein an entire coil has an approximately rectangular ring-like shape, two sides of the rectangle opposing to each other function as a pair of effective conductors for contributing to generating a thrust force for a moving body of a linear motor, and the other two sides opposing to each other function as a pair of connecting conductors for connecting between the effective conductors. In this constitution, parts close to the ends on the effective conductors are bent at an approximately right angle with respect to a coil plane such that a pair of the connecting conductors are offset from the coil plane, and extend in parallel with the coil plane, and the transverse section of the connecting conductors is in an approximately trapezoidal shape including parallel sides approximately perpendicular to the coil plane, and a tilted side opposing to the coil plane, and tilted in a direction opposite to the direction of the offset of the connecting conductors in this extending state where the coil plane is defined as a plane including individual axial centers of a pair of the effective conductors.

In this single coil, the parts close to the ends of the effective conductors are bent at an approximately right angle with respect to the coil plane, and bending at an approximately right angle offsets (separates in parallel) the connecting conductors from the coil plane. Then, the transverse section of the connecting conductors is in an approximately trapezoidal shape, and especially parts opposing to (facing) the coil plane is in a form "tilted" toward the direction opposite to the direction of the offset of the connecting conductors.

As a result, the offset length of the connecting conductors decreases further, thereby further decreasing a projected area of the connecting conductor on a transverse section in a traveling direction when the single coils are used to from a coil unit. The effects brought about by this "tilting" will be described later in detail.

An outer periphery of the connecting conductor is perpendicular to or parallel with the coil plane because the transverse section is in a trapezoidal shape, thereby providing a proper fit to an mounting member or a magnetic pole unit.

A coil unit according to a second aspect of the present invention has a feature that the tilted angle of the tilted sides with respect to the coil plane is set in a range from 3 to 30 degrees.

The second aspect of the invention more specifically embodies the first aspect of the present invention in terms of "the angle of the tilt". According to the first aspect of the invention, a more or less effect can be provided when the connecting conductors are offset while the connecting conductors are bent at an approximately right angle, and simultaneously "the tilt" exist. However, when the tilt angle is set in the range from 3 to 30 degrees according to the second aspect of the invention, its effect can be obtained more clearly. A more preferable tilt angle exists in a range from 5 to 20 degrees.

A coil unit according to a third aspect of the present invention has a feature that the effective conductors have side surfaces parallel to the coil plane, and the tilted sides are positioned between a plane including the side surfaces on a side toward which the connecting conductors are offset, and the coil plane.

The third aspect of the invention further embodies the first aspect of the present invention in terms of "the position where the tilted sides are formed". Forming the tilted sides at this position can place the connecting conductors so close to the coil planes as a part of the transverse sections of the connecting conductors surely overlap an extension line from a transverse section of the effective conductors, thereby decreasing the offset length down to approximately the minimum.

BRIEF DESCRIPTION OF THE DRAWING

FIG. 1 shows a single coil of a coil unit for a linear motor according to the present invention, in which (A) is its perspective view, and (B) is a section of (A) along a line indicated by arrows 1B;

FIG. 3 is a plan view showing an arrangement of the coil units and magnet units;

DETAILED DESCRIPTION OF THE PREFERRED EMBODIMENTS

Figure 2A:
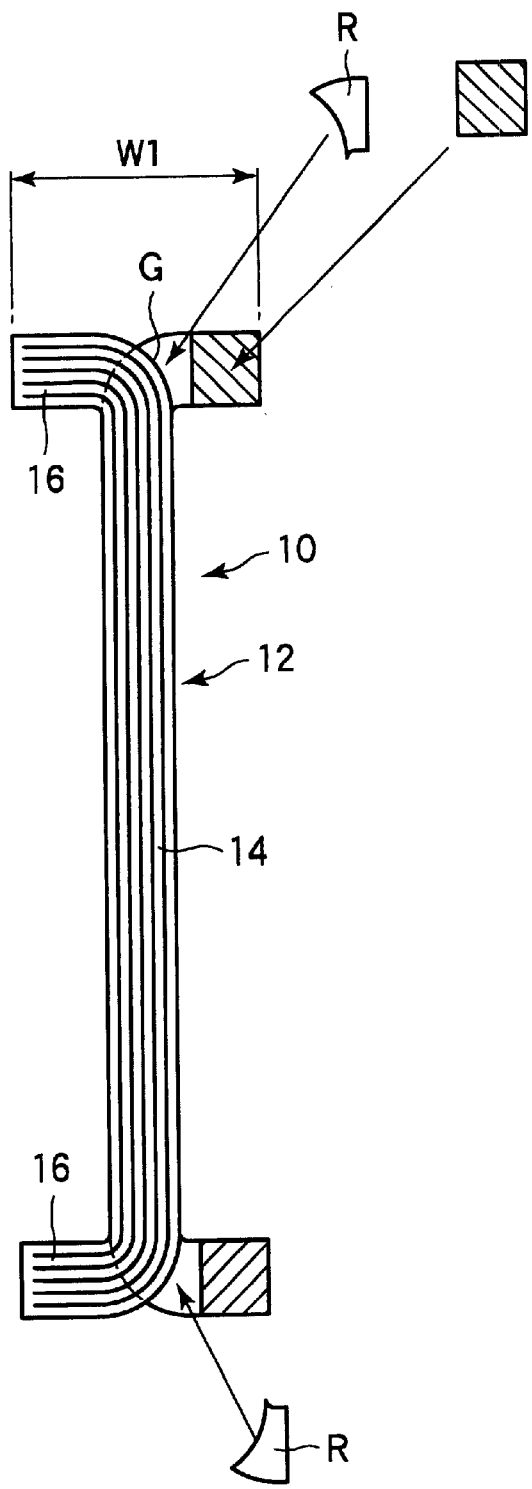
FIG. 2 shows a longitudinal sectional view of a coil unit using the single coils.

Preferred embodiments of the present invention will be described in detail based on the accompanying drawings.

FIG. 1 shows a single coil of a coil unit for a linear motor according to an embodiment of the present invention. (A) is a perspective view of the single coil, and (B) is a section view along a line indicated by arrows 1B shown in (A).

An entire single coil 12 has an approximately rectangular ring-like shape, two sides of the rectangle opposing to each other function as a pair of effective conductors 14 contributing to generating a thrust force of a moving body of a linear motor, and the other two sides opposing to each other function as a pair of connecting conductors 16 for connecting between the effective conductors 14.

A plane including individual axial centers O1 and O2 of the effective conductors 14 is defined as a coil plane CP as a matter of convenience.

Parts close to the ends of the effective conductors 14 are bent at an approximately right angle with respect to the coil plane CP. As a result, the pair of connecting conductors 16 extend in parallel with the coil plane CP while they are offset from the coil plane CP.

On the other hand, the transverse section of the connecting conductors 16 is in an approximately trapezoidal shape including parallel sides 16a and 16b approximately perpendicular to the coil plane CP, a tilted side 16c which opposes to the coil plane CP, and is tilted in a direction opposite to the direction of the bend (offset) of the connecting conductors 16, and a side 16d on a side opposite to the coil plane in this extending state.

As a result, because the tilted side 16c is positioned on the coil plane CP side, and the sides 16a (one of the two parallel sides 16a and 16b) and the 16d are respectively positioned on an outer periphery of the connecting conductors 16, planes perpendicular to and parallel with the coil plane CP appear.

A tilt angle θ of the tilted side 16c with respect to the coil plane CP is set to approximately 15 degrees in the present embodiment. It is preferable to set the tilt angle in a range from 3 to 30 degrees, and more preferably in a range from 5 to 20 degrees.

The section of the effective conductors 14 has a rectangular shape, and includes side surfaces 14a and 14b parallel to the coil plane CP, and outer side surfaces 14c and 14d perpendicular to them. The tilted side 16c is positioned between a plane EP including the side surface 14a on the bent side, and the coil plane CP.

The "trapezoid" as the sectional shape of the connecting conductors 16 is not necessarily a precise trapezoid in a geometrical sense in the nature of the present invention, and the "trapezoid" of the present invention includes a shape with rounded corners or the individual sides 16a to 16d curved more or less as long as they are within the scope of the present invention.

Next, an action based on the shape of the single coil 12 will be described while describing a constitution and an action when a coil unit 60 using the single coils 12 is applied to a linear motor LM.

Figure 2B:
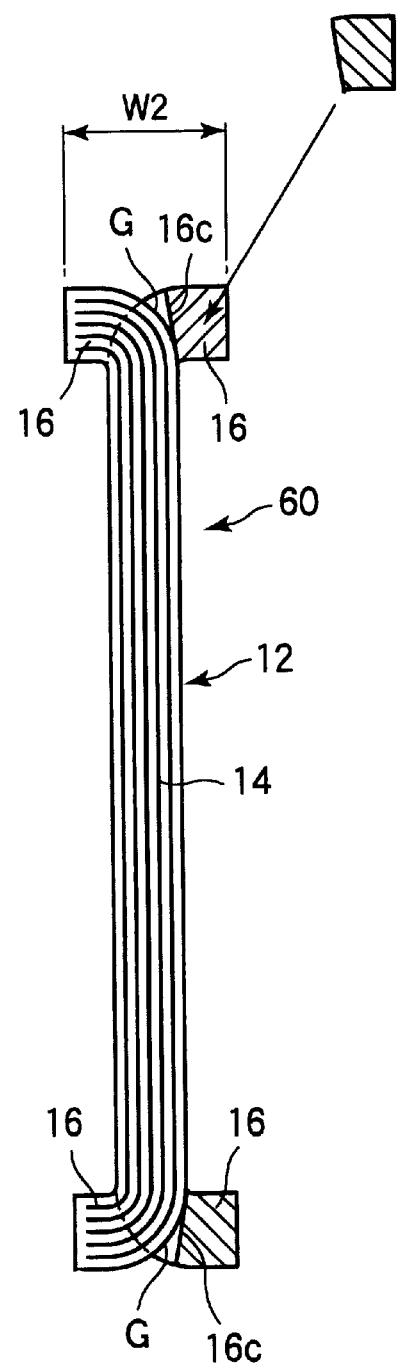
Figure 8A:
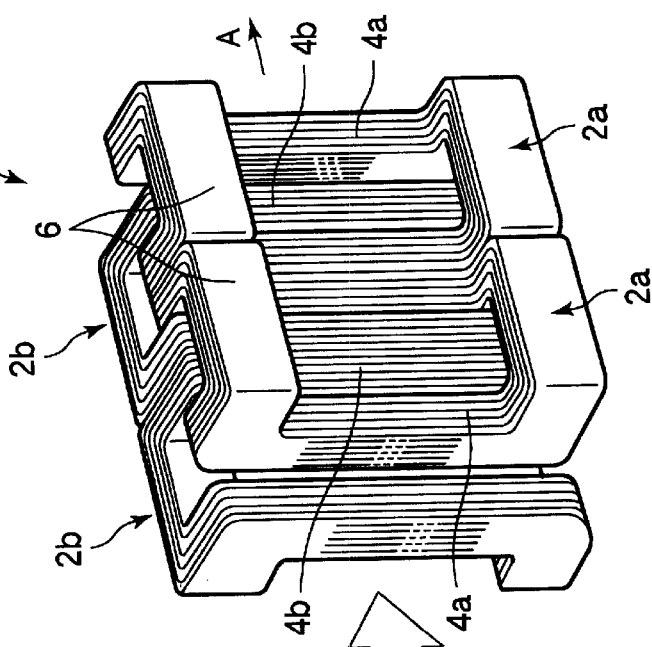
FIG. 8 is a perspective view sequentially showing processes according to a manufacturing method of a coil unit for a linear motor disclosed in Japanese Patent Laid Open No. 2001-67955.
Figure 8B:
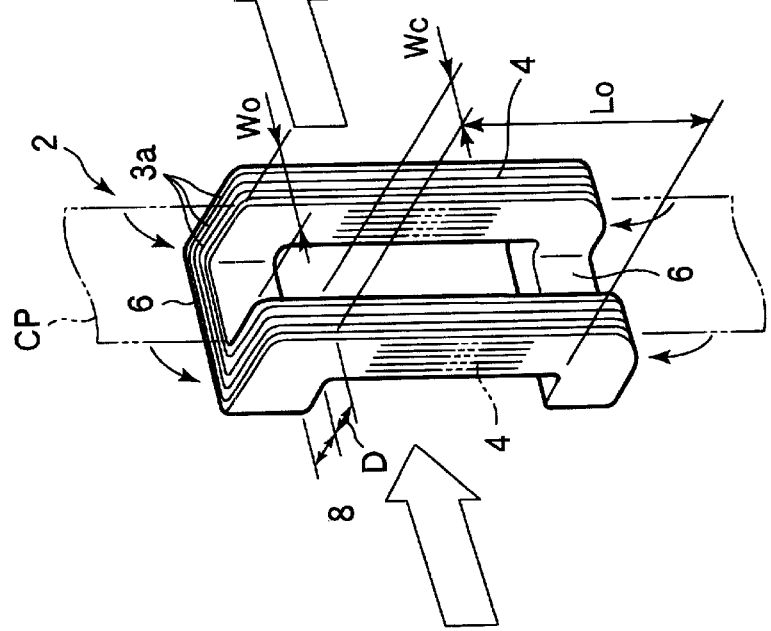
Figure 8C:
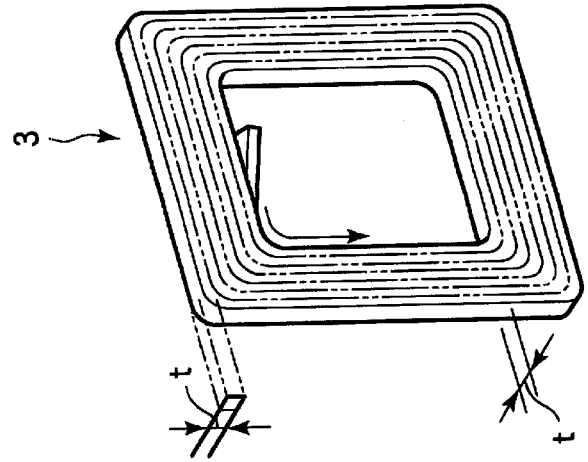

First, a constitution of the linear motor LM is described while referring to FIG. 2 and FIG. 3, and, again, FIG. 8 according to Japanese Patent Application No. Hei. 11-273579. Multiple single coils 12 are used as single coils 12U, 12V, and 12W for U, V, and W phases respectively. The following section describes how to assemble these three-phase single coils 12. Namely, first, the outer side surfaces 14c of the effective conductors 14 of the individual single coils 12 are placed adjacent to each other without a gap, and two rows of single coil groups whose connecting conductors 16 are bent in directions opposite to each other with respect to a traveling direction A are provided (a group of the single coils placed as an inversed U-shape on the upper side, and a group of single coils placed as a U-shape on the lower side in FIG. 3). Then, the single coils 12 in the individual groups are opposed to each other such that the ends of the two effective conductors 14 in one group are inserted into an opening of one effective conductors 14 in the other group, resulting in arranging the effective conductors 14 at an equal pitch. One single coil group is arranged in an order of U, V, W, U, V, W, . . . , and the other single coil group is arranged in the same order of U, V, W, U, V, W, . . . as shown in FIG. 3. Then, the phases of both of the single coil groups are adjusted such that ends of the effective conductors 14 for the V phase and the W phase in one single coil group are interposed between the effective conductors 14 of the single coil 12 for the U phase in the other single coil group.

After this procedure, the sections of the individual effective conductors 14 for the U, V, and W phases are arranged consecutively along the traveling direction. Using single coils 12 whose connecting conductors 16 are bent at an approximately right angle with respect to the effective conductors 14 enables this arrangement, only coils corresponding to two phases appear on a section perpendicular to the traveling direction (refer to FIG. 2), and this is an extremely advantageous arrangement which requires only one type of the single coils 12.

(A) in FIG. 2 shows an assembled state of the single coils in Japanese Patent Laid Open No. 2001-67955, and (B) in FIG. 2 shows that state according to the present embodiment. The coil unit 10 itself according to the constitution in Japanese Patent Application No. Hei. 11-273579 is fairly smaller than a conventional coil unit. However, it is not possible to avoid interference of the connecting conductors 6 of the single coils 2 with each other unless a transverse width W1 (a total offset width while the connecting conductors 6 are being assembled) of the connecting conductors 6 with respect to the traveling direction is set to fairly large as clearly shown in (A) in FIG. 2.

On the other hand, in the single coil 12 according to the present embodiment, the tilted side 16c has a tilted angle θ in a direction opposite to the bent (offset) direction of the connecting conductors 16 with respect to the coil plane CP, and simultaneously its position is set inside (on the coil plane side) of the plane EP including the side surfaces 14a of the effective conductors 14. As a result, the existence of the tilt angle θ allows shifting the transverse section of the connecting conductors 16 toward the coil plane CP side largely while interference between an outer periphery G of the bent part, and the tilted side 16c of the neighboring connecting conductors 16 is not generated.

Thus, a transverse width W2 of the connecting conductors 16 (a total offset width while the connecting conductors 16 are being assembled) with respect to the traveling direction can be reduced more than the W1, and an unnecessary area (space) R can be eliminated to provide a more compact storage. This reduction contributes to reducing the width of the linear motor LM in the transverse direction with respect to the traveling direction, and a thicker casing may be used when the same width can be maintained, thereby enabling a more stable travel, and generating a stronger thrust force depending on a design.

In addition, because the sides 16a and 16d of the trapezoid of the transverse section of the connecting conductors 16 appear on the outer periphery of the connecting conductors 16, the outer periphery is perpendicular to or parallel with the coil plane CP, thereby presenting an excellent fit to a mounting member or a magnetic pole unit.

Next a manufacturing method of this single coil 12 will be described.

The single coil according to the present invention may be manufactured with any specific manufacturing methods. Namely, as long as a resultant shape eventually has the shape according to the present invention, the prescribed effects of the present invention can be provided.

Japanese Patent Laid Open No. 2001-67955 simultaneously proposes art, i.e., "a flat type wire with a thickness of t is wound predetermined turns on the same plane to form a rectangular coil sheet 3, then the pair of connecting conductors 6 are bent at an approximately 90 degrees in the same direction with respect to the effective conductors 4 to form a coil sheet 3a in a U-shape, the multiple coil sheets 3a formed into a U-shape having slightly different widths and bent positions are provided, and they are piled to obtain one single coil 2" as shown in FIG. 8.

However, this manufacturing method does not necessarily form a shape required in the present invention easily. Also, piling multiple coil sheets with slightly different widths and bent positions to manufacture a single coil has disadvantages in terms of cost and flexibility for changing design.

The following section describes a manufacturing method for the single coil according to the present invention by means of winding a single conductive wire.

Figure 4:
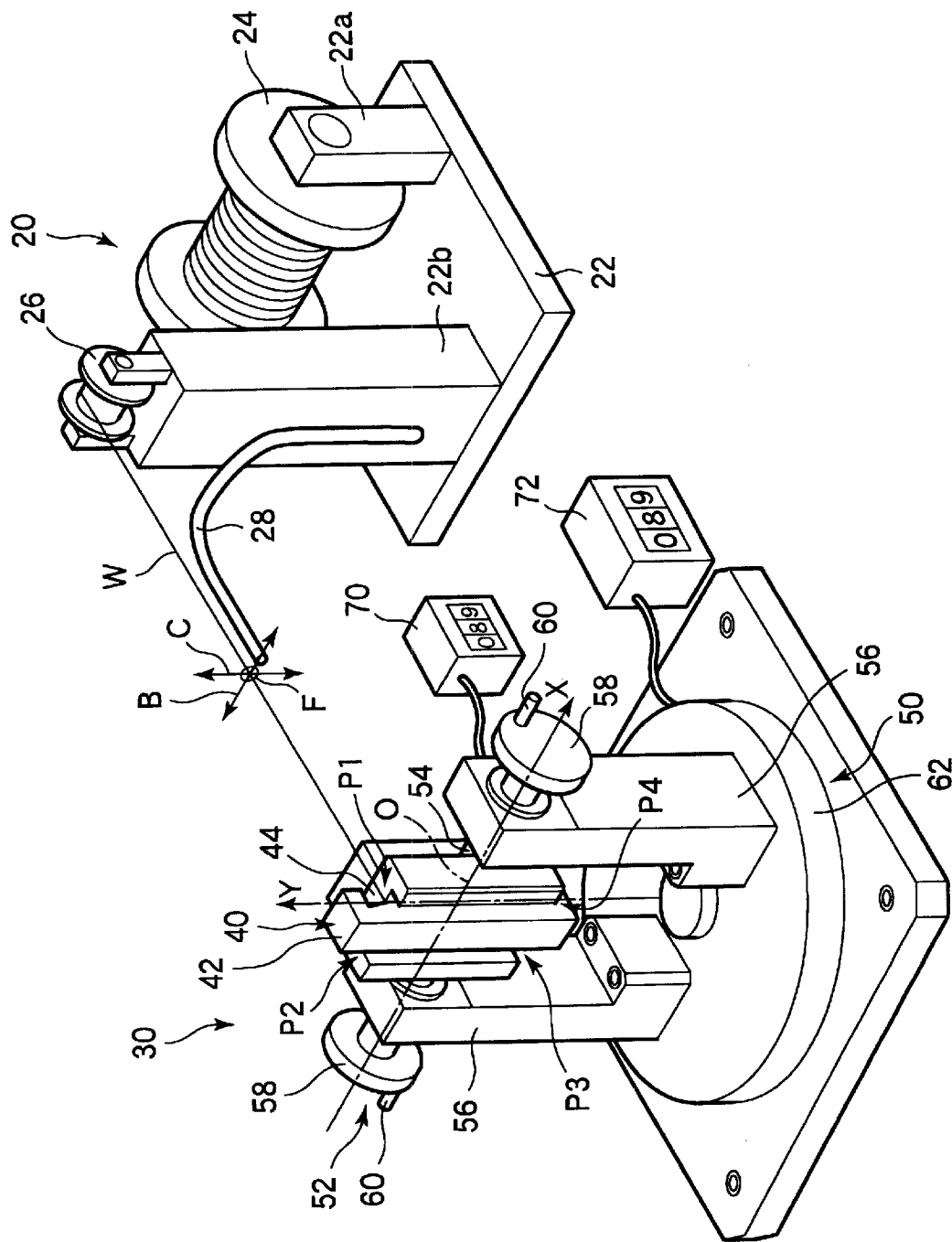
FIG. 4 is a perspective view showing an overview of a winding device for manufacturing the single coil of the coil unit for a linear motor according to the embodiment of the invention.

FIG. 4 shows a schematic for a winding device for manufacturing the single coil of the coil unit for a linear motor according to the present invention.

FIG. 4 shows a start state for winding the single coil 12 where Z axis is defined as a direction to which a conductive wire W which will be a material of the single coil 12 is fed out, X axis is defined as an axis in the horizontal direction (a rotation center of sides which will be the connecting conductors 16), and Y axis is defined as an axis in the vertical direction (a rotation center of sides which will be the effective conductors 14) as a matter of convenience.

This winding device comprises a conductive wire feeding out machine (a conductive wire feeding out mechanism) 20 for feeding out the conductive wire W in the Z axis direction, and a winding machine 30 for winding the fed out conductive wire W.

First, a constitution of the conductive wire feeding out machine 20 will be described.

This conductive wire feeding out machine 20 is provided with a base 22, a coil bobbin 24, a guide roller 26, and a guide arm 28.

A pair of first support posts 22a, and one second support post 22b are vertically (in the Y axis direction) erected on the base 22. The first support posts 22a support the coil bobbin 14 rotatably about the X axis, and recoils the wound/held conductive wire W for feeding out. The guide roller 26 is supported rotatably about the X axis on the top of the second support post 22b, and changes the feeding out direction of the conductive wire W fed out from the coil bobbin 24 to the Z axis direction. The guide arm 28 is attached on a side surface of the second support post 22b, and determines/positions the position (the coordinate) for feeding out the conductive wire W.

On the other hand, the winding machine 30 primarily comprises a winding former 40, and first and second rotating mechanisms 50 and 52.

The winding former 40 is positioned/placed such that its center coincides with the origin 0 of the X axis and the Y axis. The winding former 40 has locks P1 to P4 for the conductive wire W at positions corresponding to vertices of the rectangle of the single coil 12, and functions as a base when the winding former 40 itself rotates to wind the conductive wire W in a rectangular shape.

Figure 5:
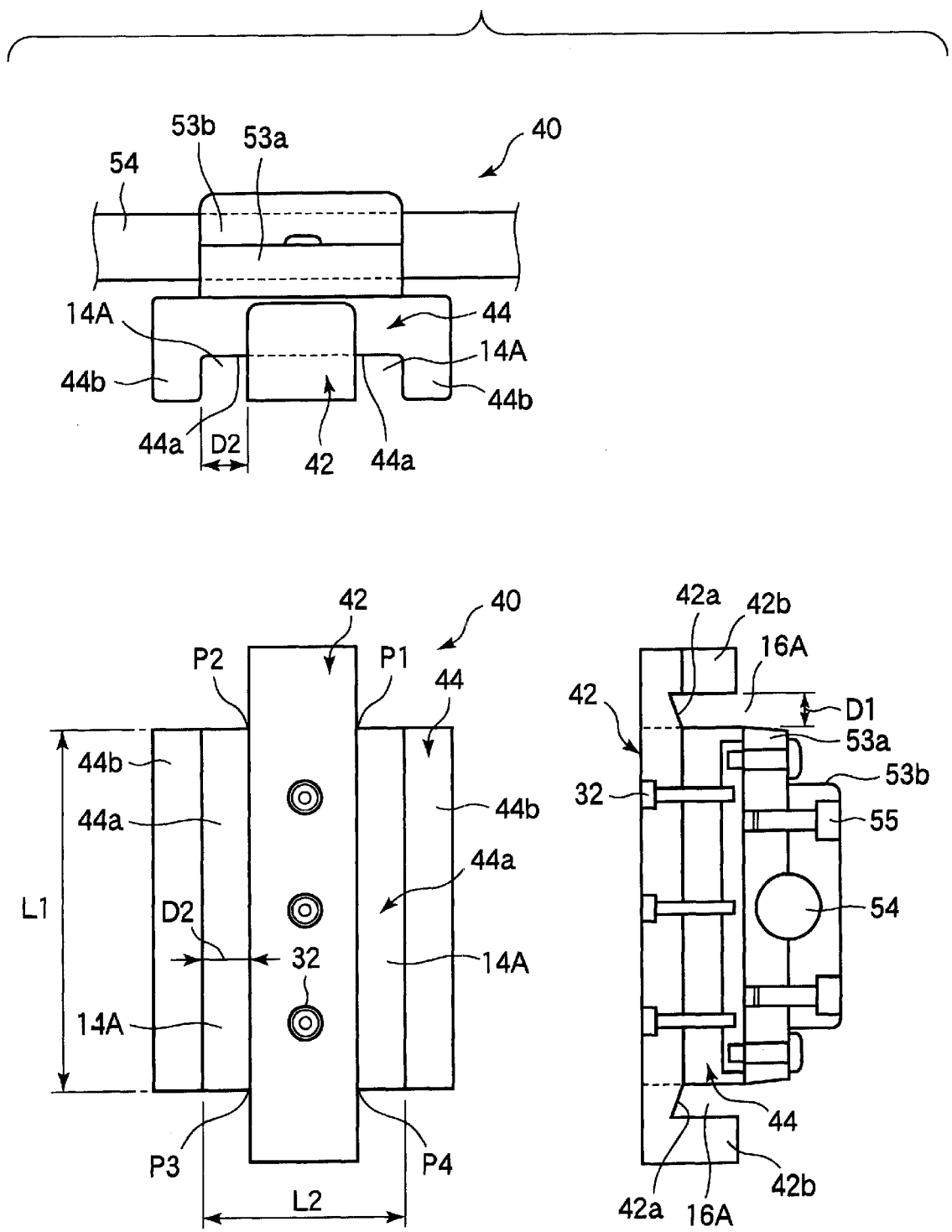
FIG. 5 shows a front view, a plan view, and a longitudinal sectional view illustrating a constitution of a winding former in the winding device.
Figure 6A:
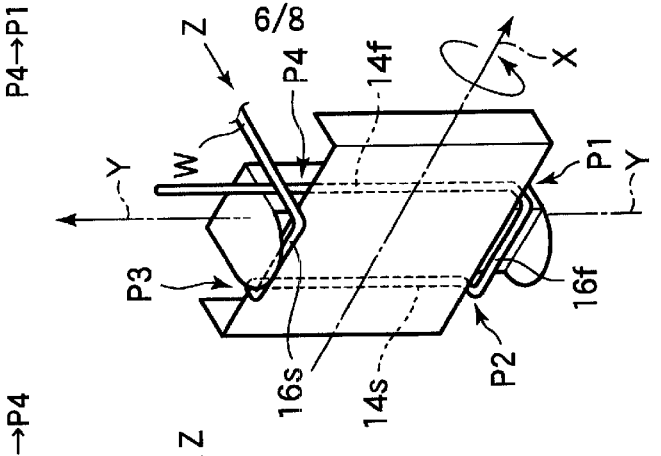
FIG. 6 is a perspective view showing processes for winding a conductive wire on the winding device.
Figure 6B:
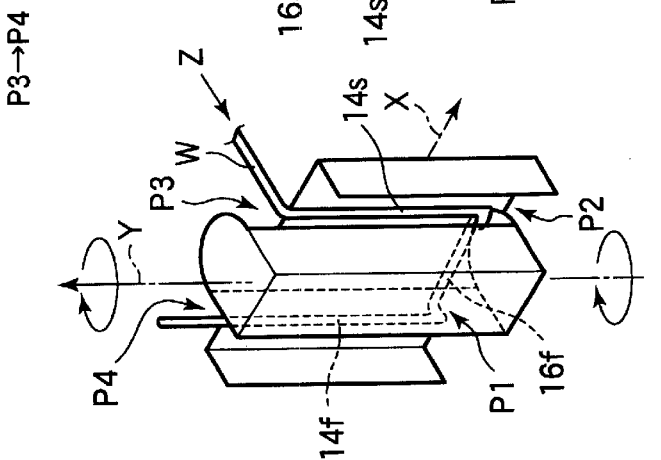
Figure 6C:
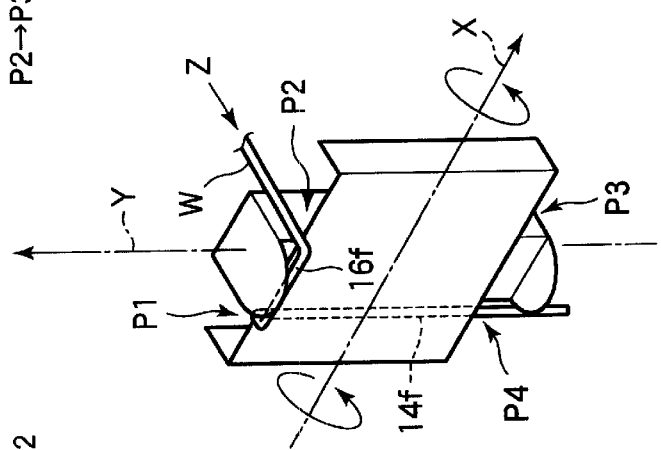
Figure 6D:
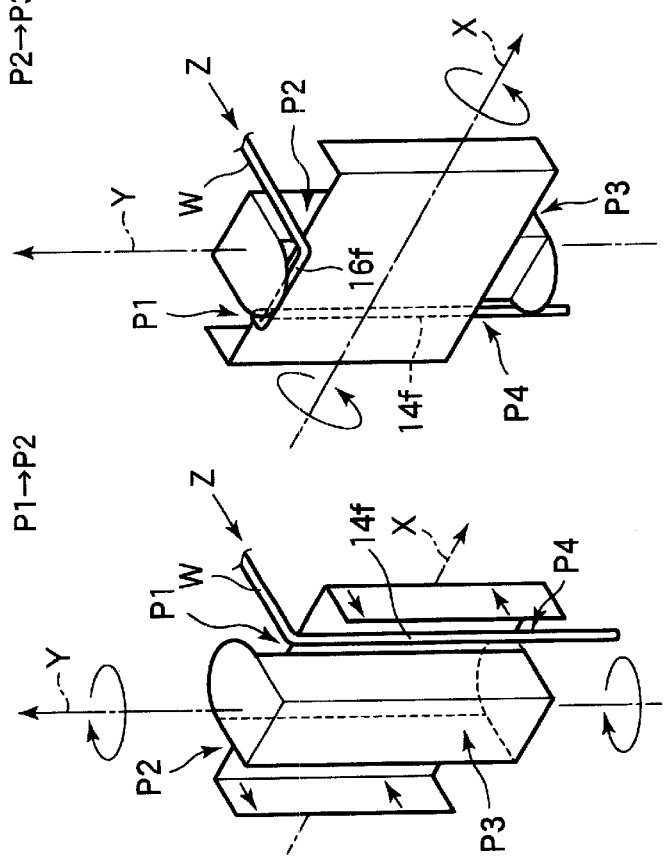

FIG. 5 shows a specific structure of the winding former 40. The winding former 40 comprises a first piece 42 and a second piece 44.

The first piece 42 is placed inside of two sides 14A which will be the effective conductors 14. The first piece 42 extends outside of two sides 16A which will be the connecting conductors 16, and has a pair of first winding parts 42a on which the connecting conductors 16 are wound respectively.

The second piece 44 is placed inside of the two sides 16A which will be the connecting conductors 16. The second piece 44 extends outside of the two sides 14A which will be the effective conductors 14, and has a pair of second winding parts 44a on which the effective conductors 14 are wound respectively.

The first winding parts 42a of the first piece 42 are formed as sloped such that it departs from the second piece more as it reaches to its end. This form serves as a guide for forming the "tilted side 16c of the trapezoid".

Flanges 42b and 44b are formed protrudingly toward the companion pieces on individual ends of the first winding parts 42a of the first piece 42, and the second winding parts 44a of the second piece 44, respectively. The flanges 42b serve as a guide for forming the "parallel side 16a of the trapezoid", the existence of these flanges 42b adjusts the shape of a wound state of the conductive wire W at the connecting conductors 16, and the section of the connecting conductors 16 is maintained as approximately "trapezoidal".

Also, the existence of the flanges 44b adjusts the shape of a wound state of the conductive wire W at the effective conductors 14, and the sections of the effective conductors 14 are maintained as approximately rectangular.

The first piece 42 and the second piece 44 are detachably overlapped crisscross through multiple bolts 32. The first winding parts 42a of the first piece 42, and the second winding parts 44a of the second piece 44 extend outside of the companion pieces 44 and 42 respectively when the first piece 42 and the second piece 44 are overlapped crisscross, and four crossed parts formed in this state function as the locks P1 to P4 for the conductive wire W, respectively.

The first rotating mechanism 50 comprises a shaft 54 provided integrally on the second piece 44 of the winding former 40 along the X axis through pressing bodies 53a and 53b, and bolts 55, a pair of third support posts 56, 56 for rotatably supporting the shaft 54 (FIG. 4), disks 58 integrated with the shaft 54, and handles 60 for rotating the disks 58. Namely, the present embodiment adopts a constitution for manually rotating the winding former 40 about the X axis.

The second rotating mechanism 52 comprises primarily a rotation base 62 for rotating the winding former 40, and the entire first rotating mechanism 50 about the Y axis. The rotation base 62 is rotated manually through the handles 60, the disks 58, and the third support posts 56 of the first rotating mechanism 50. Thus, the handles 60, the disks 58, and the third support posts 56 constitute a part of the first rotating mechanism 50, and simultaneously serve as a part of the second rotating mechanism 52.

Numerals 70 and 72 in FIG. 4 indicate counters for showing rotation numbers of the first rotating mechanism 50 and the second rotating mechanism 52, respectively.

Though the present embodiment adopts this constitution for semiautomatically rotating the winding former 40, the single coil according to the present invention can be manufactured by means of fully manual winding as long as the winding former 40 is used.

Inversely, the disks 58 and the rotation base 62 may be rotated electrically with motors (not shown in the drawing) for developing toward full automation. In this case, if the individual motors are controlled so as to maintain a feeding out speed S of the conductive wire W from the conductive wire feeding out machine 20 as constant, the tension Te of the conductive wire W is maintained approximately constant, and a smooth winding without an uneven winding is provided. Because the feeding out speed S of the conductive wire W corresponds to a rotating speed of the guide roller 26, the feeding out speed S is detected by providing a rotation speed sensor (not shown in the drawing) on the guide roller 26, for example.

Next, an action of this winding device while focusing on an action of the winding former 40 will be described.

As shown in FIG. 4 to FIG. 6, the conductive wire W fed out in the Z axis direction through the coil bobbin 24, the guide roller 26, and the guide arm 28 is bent at the lock P1 of the winding former 40, and a first effective conductor 14f is formed in an initial state as shown in (a) of FIG. 6. The conductive wire W itself may be bent, or the rotation of the winding former 40 about the X axis may be combined to form this initial state.

The second rotating mechanism 52 rotates the winding former 40 by 180 degrees with the Y axis as the center of the rotation from this state. This rotation first generates a torsion at the lock P1, and the conductive wire W is securely locked at the lock P1. Then, the winding former 40 rotates such that it aligns to the newly fed conductive wire W from this lock P1 as an origin (or a start point) to the lock P2 as an end point, and a first connecting conductor 16f is stretched across as shown in (b). Because this "stretch" is formed such that the winding former 40 "aligns to" the newly fed stress-free conductive wire W, the wire is stretched while almost no side force (torsional stress) is generated on a plane including the Z axis and the connecting conductor 16. Namely, almost no torsion generated at the lock P1 propagates to the next lock P2 while the coil has the irregular shape.

When the state (b) is formed, the winding former 40 rotates by 180 degrees about the X axis. This rotation generates a torsion at the lock P2, and the conductive wire W is securely locked at the lock P2. Then, the winding former 40 rotates such that it aligns to the conductive wire W from this lock P2 as an origin (or a start point) to the lock P3 as an end point, a next effective conductor 14s is stretched across as shown in (c). Because this "stretch" is also formed such that the winding former 40 "aligns to" the newly fed stress-free conductive wire W, the wire is stretched while almost no side force (torsional stress) is generated on a plane including the Z axis and the effective conductor 14. Namely, almost no torsion generated at the lock P2 does not propagate to the next lock P3.

Then, the winding former 40 rotates by 180 degrees again about the X axis, and the conductive wire W is stretched between the lock P3 and P4 in the exactly the same way as the conductive wire W is stretched between the lock P1 and P2 shown in (a) described before. As the result, a next connecting conductor 16s is stretched, a state shown in (d) is entered, and a winding for one full turn is completed.

Then, operations (a) to (d) are repeated, and the winding operation is completed when the counters 70 and 72 indicate predetermined winding counts (numbers of windings).

As clearly stated above, when any effective conductor 14 is wound, or any connecting conductor 16 is wound, the conductive wire W is always locked at any one of the locks P1 to P4, and is wound such that the conductive wire W is bent at 90 degrees with the lock at the center.

Thus, even if a coil is the irregular-shape coil with the special form where the two connecting conductors 16 are individually bent largely in the same direction with respect to the effective conductors 14, the conductive wire feeding out machine 20 supplies both the effective conductors 14 and the connecting conductors 16 with the new conductive wire W at the optimum direction and angle for winding. Therefore, the conductive wire W is wound smoothly and orderly without requiring an excessive winding tension.

Though the first and second rotating mechanisms 50 and 52 of the winding machine 30 always rotate the winding former 40 in the same direction, because they alternate the rotating direction of the winding former 40 about the X axis and the Y axis, and the four forms:

1) A forward rotation by 180 degrees about the axis parallel with the connecting conductors 16((d) to (a)),
2) A forward rotation by 180 degrees about the axis parallel with the effective conductors 14((a) to (b)),
3) A reverse rotation by 180 degrees about the axis parallel with the connecting conductors 16((b) to (c)), and
4) A reverse rotation by 180 degrees about the axis parallel with the effective conductors 14((c) to (d))

are repeated when observed in terms of the rotation of the winding former 40 with respect to the conductive wire W, the reverse rotation returns the conductive wire W twisted by the forward rotation to an original state after one full turn. Thus, the torsion is not accumulate after any number of rotations.

Further, because the new winding is conducted on the plane including the Z axis and the effective conductors 14 or on the plane including the Z axis and the connecting conductor 16 with generating almost no side force (torsional stress) as described before, almost no torsional stress is present on the conductive wire W between the locks, and a state where a torsion generated by a certain lock hardly propagates to a next lock is generated.

The single coil 12 manufactured with the method or the device according to the present embodiment may take different forms when the dimensions of the first and second winding parts 42a and 44a (D1 and D2 in FIG. 5), and the winding number are selected. Also, the lengths L1 and L2 of the effective conductor 14 and the connecting conductor 16 can be freely selected, and the winding is possible for any setting of them.

The method adopted in Japanese Patent Laid Open No. 2001-67955 belongs to a method called as "regular winding", and the method according to the present embodiment belongs to a method called as "random winding" (as long as the feeding out position is not controlled) in general. The linear density of the effective conductors 14 (the space factor of the conductors) of the single coil 12 is not necessarily low when it is originally manufactured by means of winding the conductive wire W on the winding former 40. However, applying a forming process or a compressing process after the winding can further increase the linear density of the effective conductors 14, and the random winding can provide a linear density which is not inferior to that is provided by the regular winding. Also, this process can form the transverse sections of the connecting conductors 16 and the effective conductors 14 as "a trapezoid" and "a rectangle" respectively which have higher densities.

Figure 7:
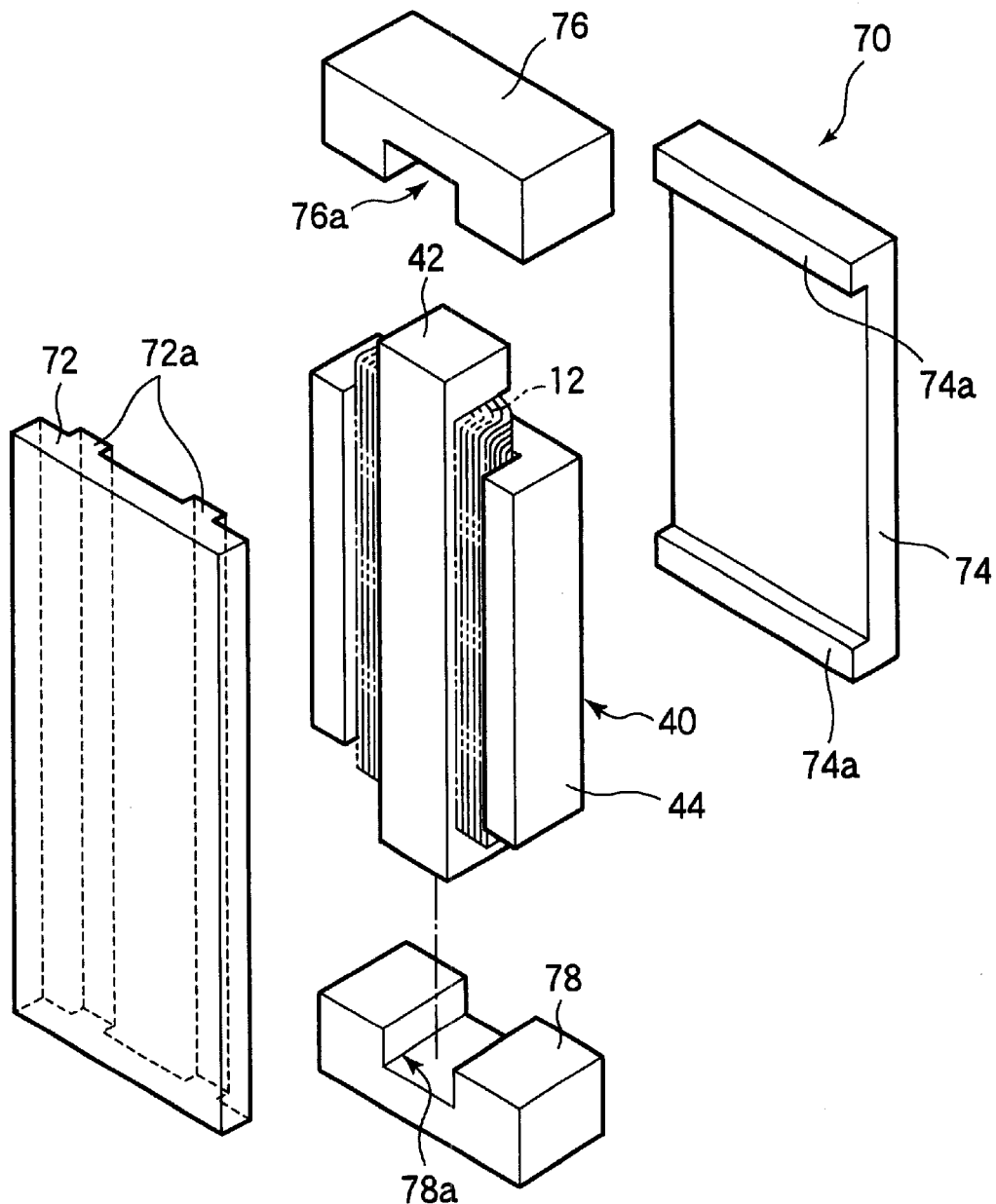
FIG. 7 is an exploded perspective view showing a constitution of a forming tool in the embodiment.

For example, a forming tool 70 is attached on the single coil 12 wound in this way while the single coil 12 is being wound on the winding former 40. FIG. 7 shows this state.

The forming tool 70 comprises plates 72, 74, 76, and 78 for clamping a winding former 40 on which the single coil 12 is being wound. Protrusions 72a and 74a are formed on the plates 72 and 74 respectively, and recesses 76a and 78a are formed on the plates 76 and 78 respectively for matching with the shape of the winding former 40. Bolts and bolt holes for fastening are omitted from FIG. 7.

The forming tool 70 is temporarily fastened to the winding former 40 at first, and a predetermined current flows through the conductive wire W in this state. As a result, the conductive wire W generates heat, and the forming tool 70 is further tightened from the temporal fastened state when the temperature of the conductive wire W increases to a plastic range later. As a result, the conductive wire W in the plastic range is formed into a predetermined shape.

This forming also provides the single coil 12 without deviations in the rectangular shape of the transverse section of the effective conductors 14, the trapezoidal shape of the transverse section of the connecting conductors 16, and the size.

The present invention provides a single coil more compact in size, and a coil unit using the same single coils.

What is claimed is:

1. A single coil of a coil unit for a linear motor, wherein
    an entire coil has an approximately rectangular ring-like shape, two sides of said rectangle opposing to each other function as a pair of effective conductors for contributing to generating a thrust force for a moving body of the linear motor, and the other two sides opposing to each other function as a pair of connecting conductors for connecting between the effective conductors,
    parts close to ends on the effective conductors are bent at an approximately right angle with respect to a coil plane such that the pair of connecting conductors are offset from the coil plane, and extend in parallel with the coil plane, where the coil plane is defined as a plane including individual axial centers of the pair of effective conductors, and
    a transverse section of said connecting conductors is in an approximately trapezoidal shape including parallel sides approximately perpendicular to the coil plane, and a tilted side opposing to the coil plane and tilted in a direction opposite to the direction of the offset of the connecting conductors in this extending state.

2. The single coil of a coil unit for a linear motor according to claim 1, wherein said effective conductors have side surfaces parallel to the coil plane, and the tilted sides are positioned between a plane including ones from those side surfaces on a side toward which the connecting conductors are offset, and the coil plane.

3. The single coil of a coil unit for a linear motor according to claim 1, wherein a tilted angle of said tilted side with respect to the coil plane is set in a range from 3 to 30 degrees.

4. The single coil of a coil unit for a linear motor according to claim 3, wherein said effective conductors have side surfaces parallel to the coil plane, and the tilted sides are positioned between a plane including ones from those side surfaces on a side toward which the connecting conductors are offset, and the coil plane.

5. A winding former for manufacturing the single coil of a coil unit for a linear motor wherein
    an entire coil has an approximately rectangular ring-like shape, two sides of said rectangle opposing to each other function as a pair of effective conductors for contributing to generating a thrust force for a moving body of the linear motor, and the other two sides opposing to each other function as a pair of connecting conductors for connecting between the effective conductors, comprising:
    a first piece which is stored inside the two sides for serving as the effective conductors, extends outside of the two sides for serving as the connecting conductors, and has a pair of first winding parts on which said connecting conductors are wound respectively; and
    a second piece which is stored inside the two sides for serving as the connecting conductors, extends outside of the two sides for serving as the effective conductors, and a pair of second winding parts on which said effective conductors are wound respectively;
    wherein the first piece and the second piece are overlapped crisscross and detachably while they are opposing to each other,
    flanges for serving as guides for the parallel sides of the trapezoid are respectively formed at the ends of the first winding parts of the first piece protrudingly toward the second piece,
    the first winding parts of the first piece are formed such that the distance from said first piece to the second piece increases as it measures closer to the ends of the first winding parts, and
    a conductive wire is wound while the conductive wire is being sequentially locked to four crossing parts formed when the first piece and the second piece are overlapped crisscross.

* * * * *